(12) United States Patent
Tivarovsky (10) Patent No.: US 10,760,576 B2
(45) Date of Patent: Sep. 1, 2020

(54) VERTICAL PUMP HAVING MOTOR SUPPORT WITH TRUSS ELEMENTS

(71) Applicant: ITT MANUFACTURING ENTERPRISES LLC., Wilmington, DE (US)

(72) Inventor: Leonid Tivarovsky, Duarte, CA (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 182 days.

(21) Appl. No.: 14/511,328

(22) Filed: Oct. 10, 2014

(65) Prior Publication Data

US 2016/0102668 A1   Apr. 14, 2016

(51) Int. Cl.
  *F04D 13/08* (2006.01)
  *F04D 13/02* (2006.01)
  (Continued)

(52) U.S. Cl.
  CPC ............ *F04D 13/08* (2013.01); *F04D 13/021* (2013.01); *F04D 29/605* (2013.01); *F16M 11/20* (2013.01)

(58) Field of Classification Search
  CPC ...... F04D 13/08; F04D 13/021; F04D 13/086; F04D 13/10; F04D 29/426; F04D 29/605;
  (Continued)

(56) References Cited

U.S. PATENT DOCUMENTS

| 646,166 A | 2/1900 | Sears et al. |
| 2,351,427 A | 6/1944 | Henshaw |

(Continued)

FOREIGN PATENT DOCUMENTS

| CN | 202353373 | 7/2012 |
| JP | 59221500 | 12/1984 |

(Continued)

OTHER PUBLICATIONS

"Pump and Pump System Glossary," pumpfundamentals.com http://www.pumpfundamentals.com/pump_glossary.htm, which discloses "(vertical turbine pump): the casing of one stage a multi-stage vertical turbine pump." A triangular support window is shown behind Element 17 on p. 9.

(Continued)

*Primary Examiner* — Devon C Kramer
*Assistant Examiner* — Christopher J Brunjes
(74) *Attorney, Agent, or Firm* — Moritt Hock & Hamroff LLP; Bret P. Shapiro (57) ABSTRACT

A vertical pump has a motor support for arranging between a lower pump assembly and an upper motor assembly in relation to a vertical pump axis. The motor support features a base plate for coupling to the lower pump assembly; a mounting plate for coupling to the upper motor assembly; and at least three pairs of truss elements connected between the base plate and the mounting plate and oriented obliquely in relation to the vertical pump axis, each pair having respective truss elements with converging ends coupled to one of the base plate or mounting plate at a substantially common point and with diverging ends coupled to the other of the base plate or mounting plate at different points.

17 Claims, 7 Drawing Sheets

(51) Int. Cl.
*F04D 29/60* (2006.01)
*F16M 11/20* (2006.01)

(58) Field of Classification Search
CPC .................. F04D 29/62; F04D 29/628; F04D 29/60–648; F16M 11/00; F16M 11/13; F16M 13/00; F16M 11/20; F16M 11/22; F04B 23/023; H02K 5/04; H02K 5/26
USPC ............. 417/360, 363, 423.3, 423.15, 424.1, 417/424.2; 248/583, 586, 644, 678, 60
See application file for complete search history.

(56) References Cited

U.S. PATENT DOCUMENTS

| | | | |
|---|---|---|---|
| 2,355,370 A | | 8/1944 | Frey |
| 2,457,340 A | | 12/1948 | Berry |
| 2,931,601 A | | 4/1960 | Johnson |
| 3,666,219 A | | 5/1972 | Baus |
| 4,063,849 A | | 12/1977 | Modianos et al. |
| 4,138,079 A | | 2/1979 | Ehret et al. |
| 4,224,363 A | | 9/1980 | Veronesi et al. |
| 4,450,373 A | | 5/1984 | Miller et al. |
| 4,927,252 A | * | 5/1990 | Burr ........................ G02B 23/00 359/364 |
| 5,496,150 A | | 3/1996 | Claxton, III et al. |
| 5,975,480 A | * | 11/1999 | Schaefer .................. F16M 7/00 248/651 |
| 6,810,670 B2 | * | 11/2004 | Bruck ...................... F23C 13/00 431/170 |
| 6,843,455 B1 | * | 1/2005 | Wentworth ............... B60S 3/00 15/316.1 |
| 8,226,352 B2 | | 7/2012 | Gutierrez et al. |
| 8,585,361 B1 | | 11/2013 | Terrell |
| 2007/0125910 A1 | * | 6/2007 | Cepollina ................ B64G 4/00 244/172.6 |
| 2009/0180874 A1 | * | 7/2009 | Gutierrez ................ F04D 13/02 415/219.1 |
| 2011/0278777 A1 | | 11/2011 | Allaire |
| 2012/0067449 A1 | | 3/2012 | Pesek |
| 2012/0091265 A1 | | 4/2012 | Stretton et al. |
| 2012/0227653 A1 | | 9/2012 | Widmer .................... B63B 5/24 114/85 |
| 2013/0067853 A1 | * | 3/2013 | Baker ....................... F03D 1/04 52/745.17 |
| 2015/0267713 A1 | * | 9/2015 | Robinson .............. F04D 29/403 415/200 |

FOREIGN PATENT DOCUMENTS

| | | |
|---|---|---|
| JP | 2010174637 | 8/2010 |
| KR | 20110058163 | 6/2011 |
| KR | 101250054 | 3/2013 |

OTHER PUBLICATIONS

"Water Supply Pumps," indiamart.com http://www.indiamart.com/technoflo/water-supply-pumps.html#hg-verticalin- , which discloses inline-pumps, including an HG Vertical In-line Pump with vertical struts supporting the motor body.
KR20110058163 English Language Abstract (1 page).
KR 101250054 English Language Abstract (1 page).
JP2010174637 English Language Abstract (2 pages).
JP59221500 English Language Abstract (2 pages).
CN202353373 English Language Abstract (1 page) Applicant(s) Name Shanghai SK Chemical & Petroleum Equipment Corporation Ltd.;Shanghai Shenkai Petroleum Instrument Co., Ltd.

* cited by examiner

FIG. 1A: Known Vertical Pump With Typical Motor Support Design
(PRIOR ART)

FIG. 1B(1): Vertical Pump With Existing
(PRIOR ART)    Discharge Head Design

FIG. 1B(2): Vertical Pump With Existing Discharge Head Design, Top View
(PRIOR ART)

FIG. 2A: Vertical Pump With Innovative Motor Support Design

FIG. 2B: Equivalent (von-Mises) Stresses In Motor Support Design With Truss Element FIG. 3A: Vertical Pump With Innovative Discharge Head Design FIG. 3B: Motor Support For Vertical Pump In Fig. 3A With Innovative Discharge Head Design (TOP-DOWN VIEW)

VERTICAL PUMP HAVING MOTOR SUPPORT WITH TRUSS ELEMENTS

BACKGROUND OF THE INVENTION

1. Field of the Invention

The present invention relates to a vertical pump; and more particularly to a motor support for a multistage vertical pump at high pressure, including vertical turbine solids handling (VTSH) pumps.

2. Brief Description of Related Art

VTSH pumps are known in the art which operate in an upright position and employ a bowl assembly including a rotary impeller submerged in a body of liquid or fluid to be pumped having entrained stringy material and other solids. VTSH pumps are typically efficient over a broad capacity range than conventional solids-handling pumps, and can be used with a wide variety of standard above-ground drives, thus eliminating the need for submersible drives.

Above ground components of vertical pumps are often subjected to mechanical resonance. The potential for mechanical resonance could exist if the system's natural frequency is too close to the operating speed. The buildup of large vibration amplitude causes contact wear between the bearings and bearing journals on the shaft. As a result, pumps as well as motor lives are shortened.

Figure 1A:
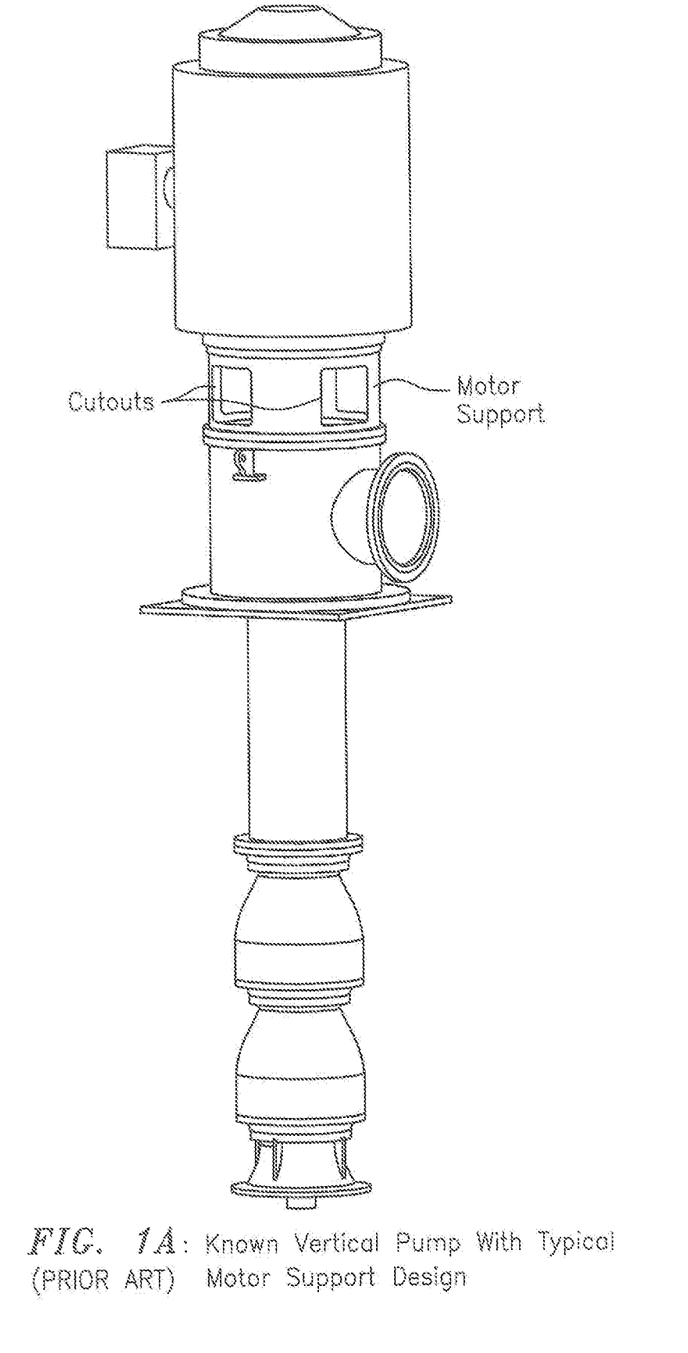
FIG. 1A shows a diagram of a side view of a known vertical pump, including a vertical turbine solids handling (VTSH) pump assembly, e.g., having a motor support design with a motor support with cutouts; where FIG. 1B(1) shows a diagram of a partial side view of a known vertical pump having a discharge head design with a motor support; and where FIG. 1B(2) shows a top down view of the discharge head design in FIG. 1B(1).
Figure 1B:
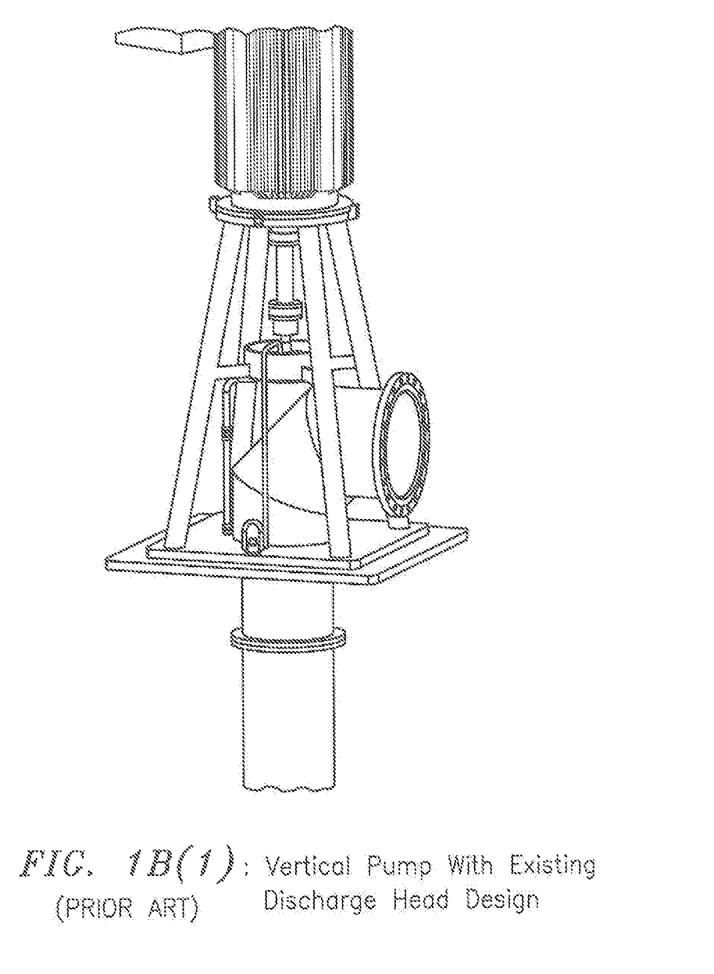

To prevent this problem at the design stage, a pump-motor system should be detuned in order to reduce its stiffness, lowering natural frequency response away from potential points of excitation. Traditionally, it's been achieved by (see FIG. 1):

1. Decreasing wall thickness of motor support;
2. Adding radial cutouts to the motor support;
3. Lengthening the height of the motor support;
4. Combination of one or more of the methods listed above.

However, using methods 1 and 2 are typically limited by the area of the motor support cross section needed to withhold hydraulic thrust of the pump, and motor torque transferred by the powertrain.

Using method 3 is usually limited by customer's constraints and requirements.

Other VTSH pumps are also known, including U.S. Pat. Nos. 4,063,849 and 5,496,150, where the '849 patent discloses a discharge pump having a discharge elbow with diametrically-opposing openings, and where the '150 patent discloses a VTSH pump having a discharge elbow without any such diametrically-opposing openings, which are both incorporated by reference in their entirety. See also U.S. Pat. No. 8,226,352, which is assigned to the assignee of the present patent application, and which is incorporated by reference in its entirety.

Based upon the aforementioned, there is a need in the industry for a better vertical pump design that overcome these problems in the known vertical pump designs.

SUMMARY OF THE INVENTION

In summary, the present invention provides a special motor support design, which allows reducing the natural frequency response of the pump-motor system without compromising torsional rigidity and axial stiffness. The motor support design may consist of two horizontal mounting plates connected by peripherally located truss elements (see FIGS. 2 and 3), e,g, unlike one typical design of the known motor support (see FIGS. 1B(1) and (2)), where the plates are connected by a single pipe configuration. All structural components in both cases/embodiments may be welded together.

Particular Embodiments

In particular, and by way of example, the present invention provides a new and unique vertical pump having a motor support for arranging between a lower pump assembly and an upper motor assembly in relation to a vertical pump axis, the motor support featuring:

a base plate for coupling to the lower pump assembly;

a mounting plate for coupling to the upper motor assembly; and at least three pairs of truss elements connected between the base plate and the mounting plate and oriented obliquely in relation to the vertical pump axis, each pair having respective truss elements with converging ends coupled to one of the base plate or mounting plate at a respective substantially common point and with diverging ends coupled to the other of the base plate or mounting plate at different points.

The vertical pump and/or motor support according to the present invention may also include one or more of the following features:

The base plate may be configured as a circular flat ring; the mounting plate may be configured as a corresponding circular flat ring; each pair may include respective converging ends coupled to the mounting plate at a respective 90° polar coordinate point; and adjacent pairs may include respective diverging ends coupled to the base plate at respective 90° polar coordinate points.

The base plate may also be configured as a square having four corners; the mounting plate may be configured as a circular ring; each pair may include respective converging ends coupled to the mounting plate at a respective 90° polar coordinate point; and each adjacent pair of truss elements may include respective diverging ends coupled to the base plate at respective corner points.

The truss elements may be welded to the base plate and the mounting plate.

The base plate and the mounting plate may be oriented in a substantially horizontal plane that is perpendicular to the vertical pump axis.

The at least three pairs of truss elements may include, or take the form of, four pairs of truss elements.

The motor support may include a discharge head having an elbow transition with a seal housing pipe configured to receive a vertical pump shaft coupled between the motor assembly and the pump assembly, and also configured to discharge from the elbow transition a fluid being pumped by the pump assembly.

According to some embodiment, the present invention may include, or take the form of, the motor support itself for arranging between the lower pump assembly and the upper motor assembly in the vertical pump having the vertical pump axis. The motor support may include one or more of the features set forth above.

When this innovative motor support with truss elements design is used in a vertical pump application, the advantages and benefits may include one or more of the following:

1. Torsional rigidity and axial stiffness on motor supports are increased due to the structural nature of truss elements (see FIGS. 2 and 3);

2. Natural frequency response for above ground components of vertical pumps can be lowered to move away from potential points of excitation.

3. Pump life cycles are increased because vibration and rates of wear are reduced.

4. Motor life cycles are increased because of bearing(s) are less subjected to vibration.

BRIEF DESCRIPTION OF THE DRAWING

The drawing includes the following Figures:

FIG. 1 includes FIGS. 1A, 1B(1) and 1B(2), where

FIG. 2 includes FIGS. 2A and 2B, where

FIG. 3 includes FIGS. 3A and 3B, where

The drawing includes Figures having diagrams, and may not necessarily be drawn to scale.

DETAILED DESCRIPTION OF THE INVENTION

Figure 2A:
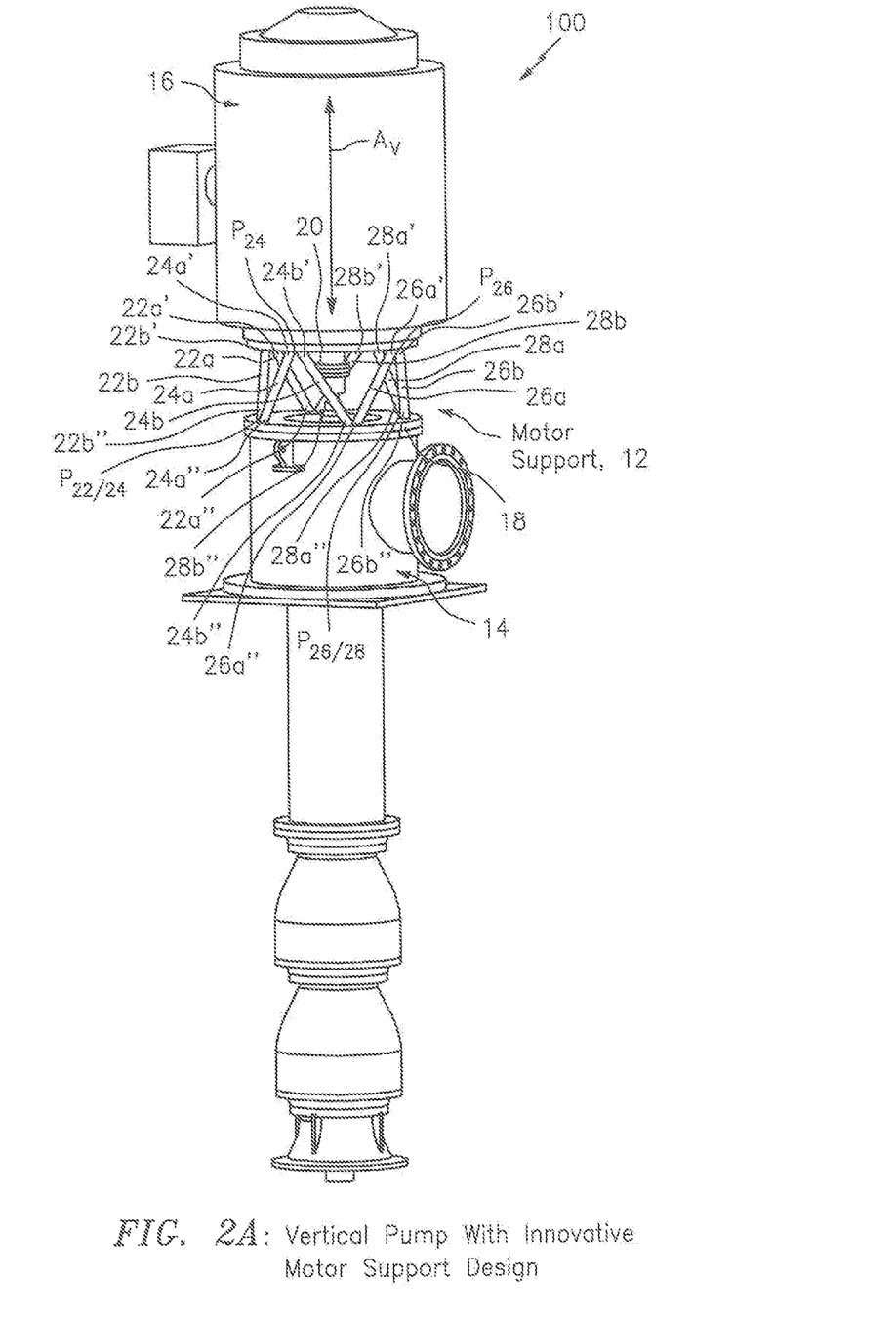
FIG. 2A shows a diagram of a side view of a vertical pump, including a vertical turbine solids handling (VTSH) pump assembly, e.g., having a new and unique motor support design with a motor support with truss elements, and where
Figure 2B:
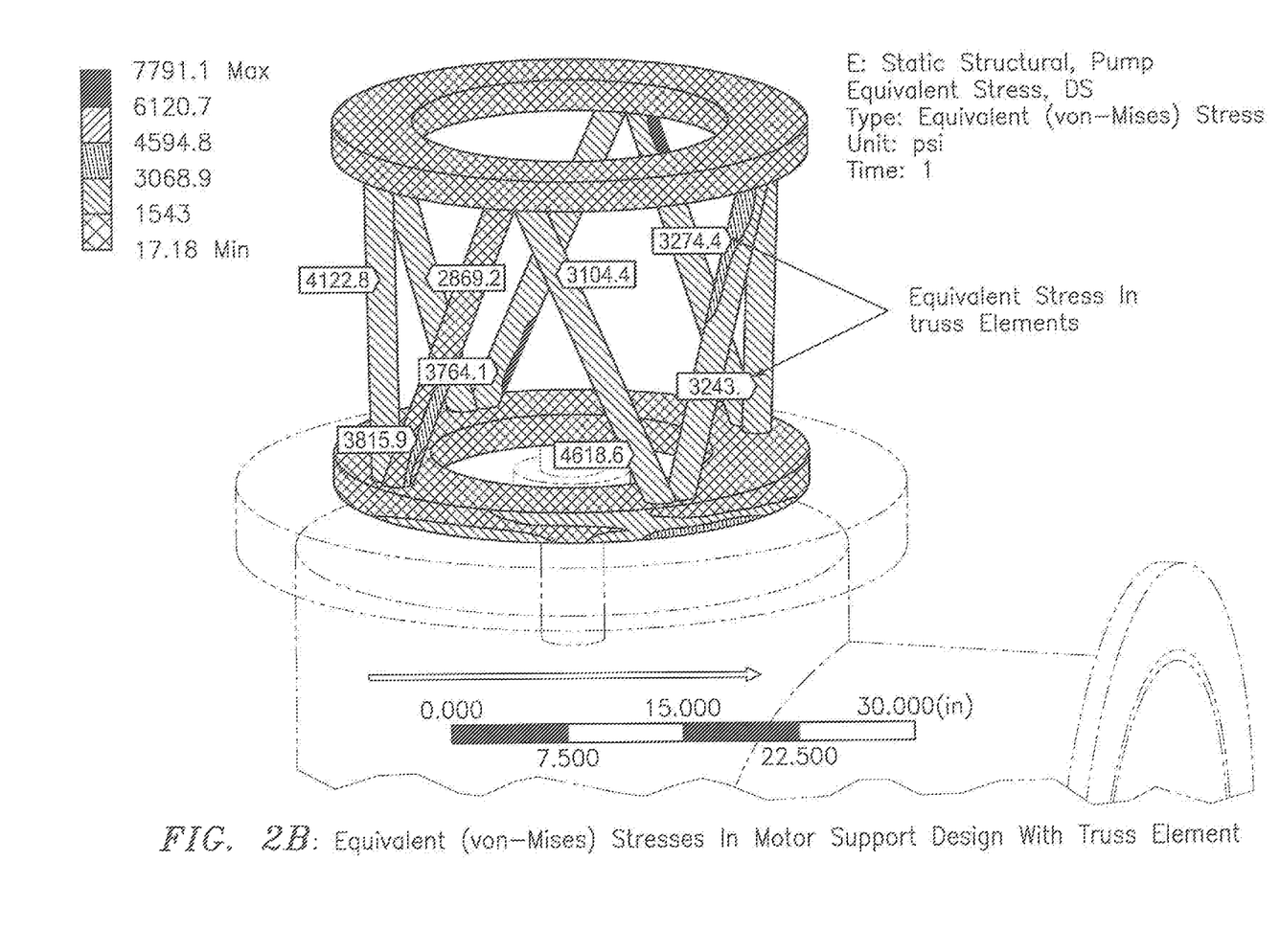
FIG. 2B is a diagram of equivalent stresses in a new motor support design with truss elements, e.g., as shown in FIG. 2A.
Figure 3A:
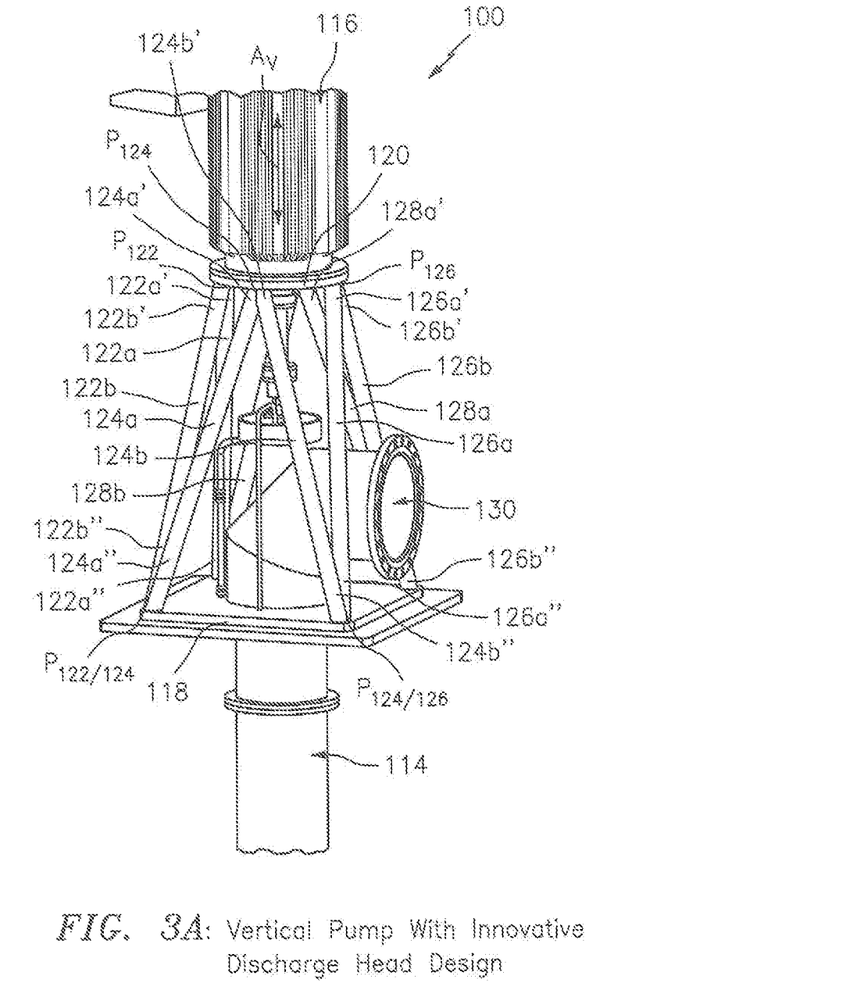
FIG. 3A shows a diagram of a partial side view of a vertical pump having a new and unique discharge head design with a motor support; and where
Figure 3B:
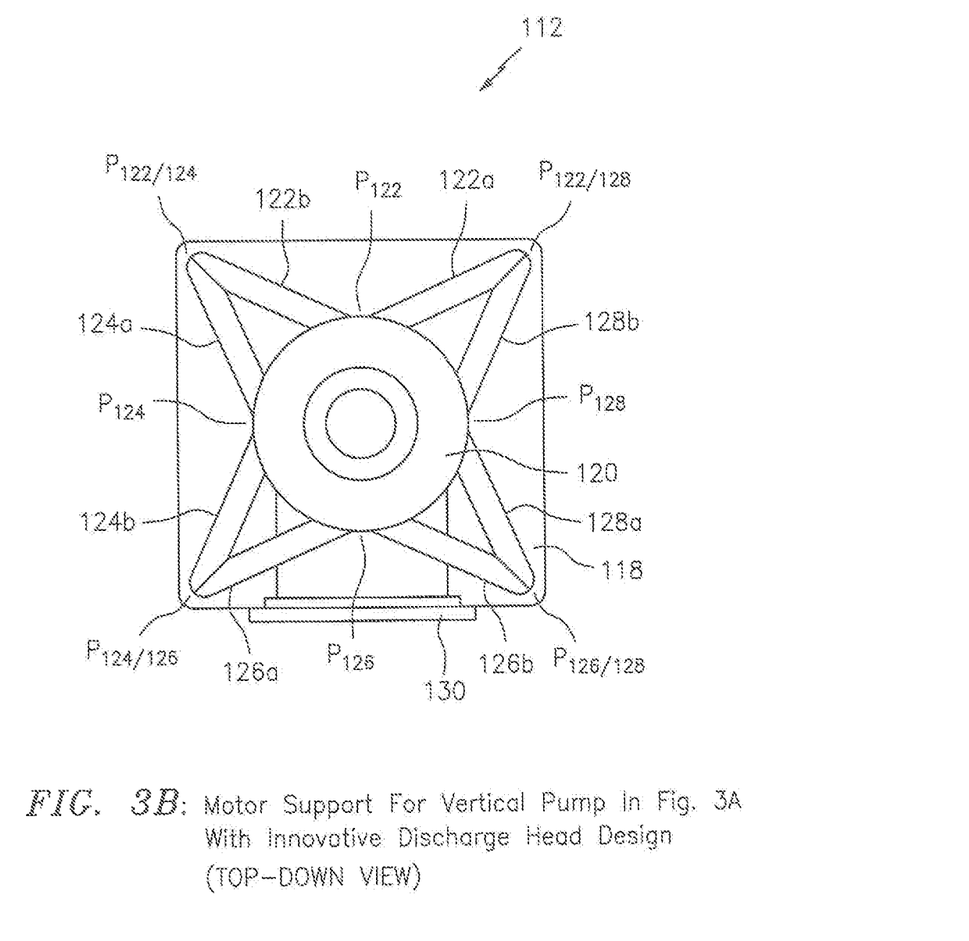
FIG. 3B shows a top down view of the discharge head design in FIG. 2B(1), all according to some embodiments of the present invention.

By way of example, and consistent with that shown in FIGS. 2 and 3, the present invention provides a new and unique vertical pump generally indicated as 10 (FIG. 2A); and 100 (FIGS. 3A and 3B) having a motor support generally indicated as 12 (FIG. 2A); 112 (FIGS. 3A and 3B) for arranging between a lower pump assembly generally indicated as 14 (FIG. 2A); 114 (FIG. 3A) and an upper motor assembly generally indicated as 16 (FIG. 2A); 116 (FIG. 3A) in relation to a vertical pump axis $A_V$.

FIG. 2

In FIG. 2A, the vertical pump 10 features a base plate 18, a mounting plate 20 and at least three pairs of truss elements 22a, 22b; 24a, 24b; 26a, 26b; 28a, 28b, which together form the motor support 12, according to some embodiments of the present invention.

The base plate 18 may be coupled to the lower pump assembly 14, e.g., by bolts, welding, etc. The scope of the invention is not intended to be limited to manner or way in which the base plate 18 is coupled to the lower pump assembly 14, which may include other coupling techniques both now known or later developed in the future.

The mounting plate 20 may be coupled to the upper motor assembly 16, e.g., by bolts, welding, etc. The scope of the invention is not intended to be limited to manner or way in which the mounting plate 20 is coupled to the upper motor assembly 16, which may include other coupling techniques both now known or later developed in the future.

The pairs of truss elements 22a, 22b; 24a, 24b; 26a, 26b; 28a, 28b are connected between the base plate 18 and the mounting plate 20, e.g., by welding, and are oriented obliquely in relation to the vertical pump axis $A_V$. As shown in FIG. 2A, each truss element 22a, 22b, 24a, 24b, 26a, 26b, 28a, 28b is oriented obliquely in relation to the vertical pump axis $A_V$ at an angle of about 45°, although the scope of the invention is not intended to be limited to any particular angle of implementation. For example, embodiments are envisioned in which the truss elements 22a, 22b, 24a, 24b, 26a, 26b, 28a, 28b are oriented obliquely in relation to the vertical pump axis $A_V$ at an angle, e.g., that is more or less than 45°, including about 40°, 35°, 30°, or about 50°, 55°, 60°, as well as angles inbetween.

Each pair has respective truss elements 22a, 22b; 24a, 24b; 26a, 26b; 28a, 28b with converging ends 22a', 22b'; 24a', 24b'; 26a', 26b'; 28a', 28b' coupled to one of the base plate 16 or mounting plate 18 at a respective substantially common point, one common point of which is labeled $p_{24}$, and another common point of which is labeled $p_{26}$ (for the sake of clarity and reducing clutter in the Figure, substantially common points $p_{22}$ and $p_{28}$ are not labeled). Each pair also has respective truss elements 22a, 22b; 24a, 24b; 26a, 26b; 28a, 28b with diverging ends 22a" 22b"; 24a", 24b"; 26a", 26b"; 28a", 28b" coupled to the other of the base plate 18 or mounting plate 20 at different points, one point of which is labeled $p_{22/24}$ where diverging ends 22b" and 22a" are coupled together, and another of which is labeled $p_{26/28}$ where diverging ends 26b" and 28a" are coupled together. (For the sake of clarity and reducing clutter in FIG. 2A, different points $p_{24/26}$ and $p_{22/28}$ are not labeled.) In particular, as shown in FIG. 2A, the vertical pump 10 includes four pairs of truss elements, where the converging ends 22a', 22b'; 24a', 24b'; 26a', 26b'; 28a', 28b' are coupled to the mounting plate 20 at the substantially common points, and where pairs of diverging ends 22a" 22b"; 24a", 24b"; 26a", 26b"; 28a", 28b" are coupled to the base plate 18 at the different points. The scope of the invention is not intended to be limited to the number of pairs of truss elements, and is intended to include embodiments having other than three or four pairs.

The base plate 18 may be configured as a circular flat ring; the mounting plate 20 may be configured as a corresponding circular flat ring; each pair of truss elements 22a, 22b; 24a, 24b; 26a, 26b; 28a, 28b may include respective converging ends 22a', 22b'; 24a', 24b'; 26a', 26b'; 28a', 28b' coupled to the mounting plate 20 at a respective 90° polar coordinate point, e.g., points $p_{24}$ and $p_{26}$; and adjacent pairs of truss elements 22b, 24a; 24b, 26a; 26b, 28a; 28b, 22a may include respective pairs of diverging ends 22b", 24a"; 24b", 26a"; 26b", 28a"; 28b", 22a" coupled to the base plate at respective 90° polar coordinate points, e.g., see points $p_{22/24}$ and $p_{26/28}$. Embodiments are envisioned, and the scope of the present invention is intended to include, the base plate 18 and the mounting plate 20 being configured as circular flat rings having substantially the same diameter, or different diameters, e.g., where the base plate 18 is configured as a circular flat ring having a diameter, and the mounting plate 20 is configured as a corresponding circular flat ring having either a smaller or larger diameter than the diameter of the base plate 18.

By way of example, the truss elements 22a, 22b; 24a, 24b; 26a, 26b; 28a, 28b may be welded to the base plate 18 and the mounting plate 20, e.g., using welding techniques both now known and later developed in the future. In other words, the scope of the invention is not intended to be limited to any particular type or kind of welding technique. Embodiments are also envisioned in which the truss elements 22a, 22b; 24a, 24b; 26a, 26b; 28a, 28b, the base plate 18 and the mounting plate 20 are made or manufactured using a mold, e.g., as one integrated and molded motor support.

The base plate 18 and the mounting plate 20 may be oriented in a substantially horizontal plane that is perpendicular to the vertical pump axis $A_V$ e.g., consistent with that shown in FIG. 2A (see also FIGS. 3A and 3B)

By way of example, FIG. 2B shows a diagram of the motor support with a modeling of equivalent stresses in truss elements, e.g., based on shading using the key/index shown in the upper left-hand side. The indicated equivalent stresses are in units of PSI. In FIG. 2B, the equivalent stresses shown in relation to the various truss elements fall between a minimum (MIN) and maximum (MAX) PSIs as shown.

FIGS. 3A and 3B

In FIGS. 3A and 3B, the vertical pump 100 features a base plate 118, a mounting plate 120 and at least three pairs of truss elements 122a, 122b; 124a, 124b; 126a, 126b; 128a, 128b, which together form the motor support 112, according to some embodiments of the present invention.

The base plate 118 is configured for coupling to the lower pump assembly 114, e.g., by bolts, welding, etc. The scope of the invention is not intended to be limited to the manner or way in which the base plate 118 is coupled to the lower pump assembly 114, which may include other coupling techniques both now known or later developed in the future.

The mounting plate 120 is configured for coupling to the upper motor assembly 116, e.g., by bolts, welding, etc. The scope of the invention is not intended to be limited to manner or way in which the mounting plate 120 is coupled to the upper motor assembly 116, which may include other coupling techniques both now known or later developed in the future.

The at least three pairs of truss elements 122a, 122b; 124a, 124b; 126a, 126b; 128a, 128b are connected between the base plate 118 and the mounting plate 120 and are oriented obliquely in relation to the vertical pump axis $A_V$. By way of example, as shown in FIGS. 3A and 3B, each truss element 22a, 22b, 24a, 24b, 26a, 26b, 28a, 28b is oriented obliquely in relation to the vertical pump axis $A_V$ at an angle of about 45°, although the scope of the invention is not intended to be limited to any particular angle of implementation. Each pair has respective truss elements 122a, 122b; 124a, 124b; 126a, 126b; 128a, 128b with converging ends 122a', 122b'; 124a', 124b'; 126a', 126b'; 128a', 128b' coupled to one of the base plate 116 or mounting plate 118 at a respective substantially common point $p_{122}$, $p_{124}$, $p_{126}$, $p_{128}$ (see FIG. 3B) and with diverging ends 122a" 122b"; 124a", 124b"; 126a", 126b"; 128a", 128b" coupled to the other of the base plate 116 or mounting plate 118 at different points $p_{122/124}$, $p_{124/126}$, $p_{126/128}$, $p_{122/128}$ (see FIG. 3B). As shown in FIGS. 3A and 3B, the vertical pump 100 includes four pairs of truss elements, where the converging ends 122a', 122b'; 124a', 124b'; 126a', 126b'; 128a', 128b' are coupled to the base plate 116 at the respective substantially common point $p_{112}$, $p_{124}$, $p_{126}$, $p_{128}$ (see FIG. 3B), and where pairs of diverging ends 122a" 122b"; 124a", 124b"; 126a", 126b"; 128a", 128b" are coupled to the mounting plate 18 at the different points $p_{122/124}$, $p_{124/126}$, $p_{126/128}$, $p_{122/128}$ (see FIG. 3B).

By way of example, and consistent with that shown in FIGS. 3A and 3B, the base plate 118 may be configured as a square having four corners. The mounting plate 120 may be configured as a circular ring; each pair of truss element 122a, 122b; 124a, 124b; 126a, 126b; 128a, 128b may include respective converging ends 122a', 122b'; 124a', 124b'; 126a', 126b'; 128a', 128b' coupled to the mounting plate 120 at a respective 90° polar coordinate point $p_{122}$, $p_{124}$, $p_{126}$, $p_{128}$ (see FIG. 3B); and each adjacent pair of truss elements 122b, 124a; 124b, 126a; 126b, 128a; 128b, 122a may include respective pairs of diverging ends 122b", 124a"; 124b", 126a"; 126b", 128a"; 128b", 122a" coupled to the base plate 118 at respective corner points $p_{122/124}$, $p_{124/126}$, $p_{126/128}$, $p_{122/128}$ (see FIG. 3B). Embodiments are envisioned, and the scope of the present invention is intended to include, the base plate 118 and the mounting plate 120 being both configured as squares having substantially the same dimensions, or different dimensions, e.g., where the base plate 118 is configured as a square having a side with a length, and the mounting plate 120 is configured as a corresponding square having a corresponding side with either a smaller or larger length than the length of the base plate. Embodiments are envisioned, and the scope of the present invention is intended to include, the base plate 118 and the mounting plate 120 being configured as other geometric shapes, e.g., like a triangle (with three pairs of truss element), a pentagon (with five pairs of truss element), a hexagon (with six pairs of truss element), a septagon (with seven pairs of truss element), an octagon (with eight pairs of truss element), etc.

By way of example, and consistent with that shown in FIG. 3A, the motor support 112 may include a discharge head 130 having an elbow transition (unlabeled) with a seal housing pipe (unlabeled) configured to receive a vertical pump shaft (unlabeled) coupled between the motor assembly 116 and the pump assembly 114, and also configured to discharge from the elbow transition a fluid being pumped by the pump assembly 100. See and compare that show in FIG. 1B(1).

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not necessarily drawn to scale.

Although the invention has been described and illustrated with respect to exemplary embodiments thereof, the foregoing and various other additions and omissions may be made therein and thereto without departing from the spirit and scope of the present invention.

What is claimed is:

1. A vertical pump, the vertical pump comprising:
    a pump assembly;
    a base plate coupled to a top side of the pump assembly;
    a motor assembly, wherein the motor assembly includes a pump motor;
    a mounting plate coupled to the motor assembly;
    a motor support, the motor support comprising:
        a first pair of truss elements between the pump assembly and the motor assembly, wherein and a first element of the first pair of truss elements is welded to the mounting plate at a first mounting point and welded to the base plate at a first base plate point, and a second element of the first pair of truss elements is welded to the mounting plate at the first mounting point and welded to the base plate at a second base plate point;
        a second pair of truss elements between the pump assembly and the motor assembly, wherein a first element of the second pair of truss elements is welded to the mounting plate at a second mounting point and welded to the base plate at the second base plate point, and a second element of the second pair of truss elements is welded to the mounting plate at the second mounting point and welded to the base plate at a third base plate point;

a third pair of truss elements between the pump assembly and the motor assembly, wherein a first element of the third pair of truss elements is welded to the mounting plate at a third mounting point and welded to the base plate at the third base plate point, and a second element of the third pair of truss elements is welded to the mounting plate at the third mounting point and welded to the base plate at a fourth base plate point; and a fourth pair of truss elements between the pump assembly and the motor assembly, wherein a first element of the fourth pair of truss elements is welded to the mounting plate at a fourth mounting point and welded to the base plate at the fourth base plate point, and a second element of the fourth pair of truss elements is welded to the mounting plate at the fourth mounting point and welded to the base plate at the first base plate point;

wherein the first, second, third, and fourth pairs of truss elements surround a vertical pump shaft of the vertical pump.

2. The vertical pump of claim 1, wherein the base plate is configured as a circular ring; and
the mounting plate is configured as a corresponding circular ring.

3. The vertical pump of claim 2, wherein the circular ring of the base plate and the circular ring of the mounting plate have the same diameter.

4. The vertical pump of claim 2, wherein each mounting point is at a respective 90° polar coordinate point of the mounting plate and each base plate point is at a respective 90° polar coordinate point of the base plate.

5. The vertical pump of claim 1, wherein:
the base plate is configured as a square having four corners;
the mounting plate is configured as a circular ring; and
each mounting point is at a respective 90° polar coordinate point of the mounting plate and each base plate point is at respective corner points of the base plate.

6. The vertical pump of claim 1, wherein the base plate and the mounting plate are oriented on respective horizontal planes that are perpendicular to a vertical axis of the vertical pump.

7. The vertical pump of claim 1, wherein the motor support further comprises a discharge head having an elbow transition with a seal housing pipe configured to receive the vertical pump shaft coupled between the motor assembly and the pump assembly, the discharge head also configured to discharge from the elbow transition a fluid being pumped by the lower pump assembly.

8. The vertical pump of claim 1, wherein the first, second, third, and fourth pairs of truss elements are arranged about a vertical axis of the vertical pump and oriented obliquely in relation to the vertical axis of the vertical pump.

9. The vertical pump of claim 1, wherein the first, second, third, and fourth pairs of truss elements are arranged about a vertical axis of the vertical pump and oriented obliquely at an angle of 45 degrees from the vertical axis of the vertical pump.

10. A vertical pump, the vertical pump comprising:
a pump assembly;
a base plate coupled to a top side of the pump assembly, wherein the base plate is configured as a circular ring;
a motor assembly, wherein the motor assembly includes a pump motor;
a mounting plate coupled to the motor assembly, wherein the mounting plate is configured as a corresponding circular ring;
a motor support, the motor support comprising:
a first pair of truss elements between the pump assembly and the motor assembly, wherein and a first element of the first pair of truss elements is welded to the mounting plate at a first mounting point and welded to the base plate at a first base plate point, and a second element of the first pair of truss elements is welded to the mounting plate at the first mounting point and welded to the base plate at a second base plate point;
a second pair of truss elements between the pump assembly and the motor assembly, wherein a first element of the second pair of truss elements is welded to the mounting plate at a second mounting point and welded to the base plate at the second base plate point, and a second element of the second pair of truss elements is welded to the mounting plate at the second mounting point and welded to the base plate at a third base plate point;
a third pair of truss elements between the pump assembly and the motor assembly, wherein a first element of the third pair of truss elements is welded to the mounting plate at a third mounting point and welded to the base plate at the third base plate point, and a second element of the third pair of truss elements is welded to the mounting plate at the third mounting point and welded to the base plate at a fourth base plate point; and
a fourth pair of truss elements between the pump assembly and the motor assembly, wherein a first element of the fourth pair of truss elements is welded to the mounting plate at a fourth mounting point and welded to the base plate at the fourth base plate point, and a second element of the fourth pair of truss elements is welded to the mounting plate at the fourth mounting point and welded to the base plate at the first base plate point;
wherein the base plate and the mounting plate are oriented on respective horizontal planes that are perpendicular to a vertical axis of the vertical pump, the circular ring of the base plate and the circular ring of the mounting plate have the same diameter, the first, second, third, and fourth pairs of truss elements surround a vertical pump shaft of the vertical pump, and each mounting point is at a respective 90° polar coordinate point of the mounting plate and each base plate point is at a respective 90° polar coordinate point of the base plate.

11. The vertical pump of claim 10, wherein the motor support further comprises a discharge head having an elbow transition with a seal housing pipe configured to receive the vertical pump shaft coupled between the motor assembly and the pump assembly, the discharge head also configured to discharge from the elbow transition a fluid being pumped by the lower pump assembly.

12. The vertical pump of claim 10, wherein the first, second, third, and fourth pairs of truss elements are arranged about the vertical axis of the vertical pump and oriented obliquely in relation to the vertical axis of the vertical pump.

13. The vertical pump of claim 10, wherein the first, second, third and fourth pairs of truss elements are arranged about the vertical axis of the vertical pump and oriented obliquely at an angle of 45 degrees from the vertical axis of the vertical pump.

14. A vertical pump, the vertical pump comprising:
a pump assembly;
a base plate coupled to a top side of the pump assembly, wherein the base plate is configured as a square having four corners;
a motor assembly, wherein the motor assembly includes a pump motor;
a mounting plate coupled to the motor assembly, wherein the mounting plate is configured as a corresponding circular ring;
a motor support, the motor support comprising:
  a first pair of truss elements between the pump assembly and the motor assembly, wherein and a first element of the first pair of truss elements is welded to the mounting plate at a first mounting point and welded to the base plate at a first base plate point, and a second element of the first pair of truss elements is welded to the mounting plate at the first mounting point and welded to the base plate at a second base plate point;
  a second pair of truss elements between the pump assembly and the motor assembly, wherein a first element of the second pair of truss elements is welded to the mounting plate at a second mounting point and welded to the base plate at the second base plate point, and a second element of the second pair of truss elements is welded to the mounting plate at the second mounting point and welded to the base plate at a third base plate point;
  a third pair of truss elements between the pump assembly and the motor assembly, wherein a first element of the third pair of truss elements is welded to the mounting plate at a third mounting point and welded to the base plate at the third base plate point, and a second element of the third pair of truss elements is welded to the mounting plate at the third mounting point and welded to the base plate at a fourth base plate point; and
  a fourth pair of truss elements between the pump assembly and the motor assembly, wherein a first element of the fourth pair of truss elements is welded to the mounting plate at a fourth mounting point and welded to the base plate at the fourth base plate point, and a second element of the fourth pair of truss elements is welded to the mounting plate at the fourth mounting point and welded to the base plate at the first base plate point;
wherein the base plate and the mounting plate are oriented on respective horizontal planes that are perpendicular to a vertical axis of the vertical pump, the first, second, third, and fourth pairs of truss elements surround a vertical pump shaft of the vertical pump, each mounting point is at a respective 90° polar coordinate point of the mounting plate and each base plate point is at respective corner points of the base plate.

15. The vertical pump of claim 14, wherein the motor support further comprises a discharge head having an elbow transition with a seal housing pipe configured to receive the vertical pump shaft coupled between the motor assembly and the pump assembly, the discharge head also configured to discharge from the elbow transition a fluid being pumped by the lower pump assembly.

16. The vertical pump of claim 14, wherein the first, second, third, and fourth pairs of truss elements are arranged about the vertical axis of the vertical pump and oriented obliquely in relation to the vertical axis of the vertical pump.

17. The vertical pump of claim 14, wherein the first, second, third and fourth pairs of truss elements are arranged about the vertical axis of the vertical pump and oriented obliquely at an angle of 45 degrees from the vertical axis of the vertical pump.

* * * * *